United States Patent [19]
Adermann et al.

[11] Patent Number: 5,485,237
[45] Date of Patent: Jan. 16, 1996

[54] PROTECTIVE CAMERA HOUSING AND OPTICAL SYSTEM FOR USE IN DESTRUCTIVE ENVIRONMENT

[76] Inventors: David A. Adermann; Anthea Dean, both of P.O. Box 218, Charlestown, NSW 2290, Australia

[21] Appl. No.: 142,395

[22] PCT Filed: Jun. 12, 1992

[86] PCT No.: PCT/AU92/00279
§ 371 Date: Oct. 14, 1993
§ 102(e) Date: Oct. 14, 1993

[87] PCT Pub. No.: WO92/22850
PCT Pub. Date: Dec. 23, 1992

[30] Foreign Application Priority Data

Jun. 12, 1991 [AU] Australia ............................. PK6628

[51] Int. Cl.[6] .................................................... G03B 17/02
[52] U.S. Cl. ........................................... 354/288; 348/82
[58] Field of Search ............................... 354/63, 81, 75, 354/288; 348/82–85

[56] References Cited

U.S. PATENT DOCUMENTS

| | | | |
|---|---|---|---|
| 2,500,379 | 3/1950 | Robinson | 248/178 |
| 2,737,864 | 3/1956 | Gutterman et al. | 354/63 |
| 3,520,238 | 7/1970 | Webb | 354/81 |
| 4,830,491 | 5/1989 | Grace | 354/63 |
| 4,963,962 | 10/1990 | Kruegle et al. | 354/81 |
| 5,162,906 | 11/1992 | Yorita et al. | 348/83 |

Primary Examiner—David M. Gray
Attorney, Agent, or Firm—Allston L. Jones

[57] ABSTRACT

A protective camera housing is designed to protect a high speed film or video camera (16) or other delicate instrumentation whilst it films or operates in close proximity to a blast in an underground mine, or other destructive environment. A faceplate with an obtuse angle of attack to the direction of travel of forces generated during underground blasting, an inbuilt shock absorbing gasket between all body plates and chassis members, rubber mounting pods and a construction material which is "bullet proof" all combine to give a high degree of protection against explosion debris and blast shock waves. An optical prism (15) built into the said faceplate bends the camera field of view through 90 degrees, allowing the camera housing to be placed in a prepared "hole in the mine tunnel wall" where the high speed camera can "look around the corner" but remain protected from the destructive forces of the blast.

16 Claims, 4 Drawing Sheets

PROTECTIVE CAMERA HOUSING AND OPTICAL SYSTEM FOR USE IN DESTRUCTIVE ENVIRONMENT

FIELD OF THIS INVENTION

This invention, PROTECTIVE CAMERA HOUSING AND OPTICAL SYSTEM FOR USE IN DESTRUCTIVE ENVIRONMENTS, hereinafter referred to as PROTECTIVE CAMERA HOUSING, relates generally to a protective camera housing with an optical system and an incorporated shock absorbing system which enables the high speed filming or videoing of blasting patterns or other applications requiring high speed filming or videoing in environments where, violently destructive forces would normally destroy sensitive film or video cameras. This PROTECTIVE CAMERA HOUSING with it's optical and shock absorbing systems is adaptable in size and configuration to accommodate different film or video camera systems without changing the basic concept.

BACKGROUND OF THIS INVENTION

High speed filming or videoing of blasting patterns in opencut mining is a well established technique which, over the past fifteen years, has produced measurable and certifiable improvements in mine productivity. To date, few attempts have been made to utilize this proven technique from opencut mines, in underground mines, because of the violently destructive forces created by blasting in the confines of an underground mine tunnel, which under normal conditions would destroy any of the said high speed cameras placed in such a destructive environment.

Both the government research establishment into mining technology for the American Government in the USA, and the South African Chamber of Mines Research Establishment in Johannesburg, have conducted limited experiments into the possibility of high speed filming of underground mine blasting patterns.

These tests have been limited because of the difficulty in designing and constructing a suitable camera housing which can consistently survive the destructive forces generated during underground mine blasting at a useful distance from the blast zone. Both the American and South African tests used modified and limited (smaller than full production) blasts which were less likely to destroy the simple metal housings constructed by both research teams to protect the high speed cameras used in their attempts to film these underground blasts.

While the results obtained from these tests have proven to be of value to both the research organisations involved and the mining industries they service, the mining industry at large has not benefited significantly from these endeavours for the following reasons.

During blasting, a plume of dust shoots down the mine tunnel, blocking the view of the blast from the camera, unless the camera is placed very close to the blast, usually closer than 10 meters, so the high speed camera's vision is not blocked by the dust created during the initial round of the blast. This is one of the major problems which has defeated earlier attempts to film underground blasting patterns.

For each production mine to significantly benefit from high speed filming or videoing of blasting patterns, it must be able to high speed film or video it's own blasting patterns, in it's own mines, under it's own working conditions, geology and problems, and be able to do so at the outer extremity of the blast zone, and inside the dust plume created by the first round of the blast.

Reduced force blasting in research establishments, so that cameras will survive, cannot provide the accuracy or mass of information required for critical analysis and measurement of information specific to the problems of a particular mine operation, or positioning cameras safely away from the blast zone only allows the dust plume to obliterate camera vision.

It is the 'on site' full force blast results, with the camera on the outer extremity of the blast zone, which will provide the critical information necessary for measurement and analysis of the 'site specific' underground mine blasts, so research and modifications can be designed for existing practices, which ultimately will result in improved practices and eventual improved productivity, as has occurred in open cut mining as a result of the use of high speed filming techniques and analysis of the results of such high speed filming.

BRIEF DESCRIPTION OF THIS INVENTION

The object of this invention, PROTECTIVE CAMERA HOUSING, is to provide a protective camera housing system which is capable of surviving full production blasting patterns in underground mining, whilst positioned at the outer extremity of the blast zone, and other yet undetermined applications, protecting the cameras and other delicate equipment contained within the housing, whilst still allowing existing high speed camera systems to be used to film or video underground blasting patterns at the outer extremity of the blast zone, and for the camera systems to survive the explosive forces generated, and for the protective camera housing to be reusable and refurbishable over a large number of times.

The PROTECTIVE CAMERA HOUSING, is designed to protect any camera system, or any other instrumentation used in it, from the destructive forces generated during an underground blast, and to be capable of operating at the outer extremity of the blast zone, whilst still allowing the camera to see and film what is occurring on the mine face whilst the explosion is actually happening.

This invention, PROTECTIVE CAMERA HOUSING, is able to survive the explosion and the destructive forces created during an explosion, and continue to safely operate at the outer extremity of the blast zone where other housings have not, because this invention does not resist the forces created, as does a housing bolted to the back (roof)of a mine tunnel, or solidly fixed to other positions within the mine tunnel confines.

There are four principles involved, which, when combined, provide the element of strength and ability to survive the forces created by underground mine explosions. These four principles are:

1. the angles built into the face plate of the PROTECTIVE CAMERA HOUSING, provide reinforcement and additional strength to the earn era housing body and transfer and transfer kinetic energy created by explosion debris or blast shock wave collision, to all areas of the PROTECTIVE CAMERA HOUSING;

2. the angle of incidence of the face plate to the direction of travel of the blast wave forces and explosion debris generated by an underground mine tunnel explosion is an obtuse angle. When explosion debris or blast shock waves collide with the said PROTECTIVE CAMERA HOUSING faceplate, this obtuse angle results in the ricochet principle coming into effect, causing explosion debris and shock waves to be deflected away from the interior of the housing, and the housing itself, and then transfers the generated kinetic energy to all areas of the PROTECTIVE CAMERA HOUSING, preventing destructive build up of kinetic energy in localized areas.

3. an optical prism (or minor or any suitably reflective surface will perform the same task without changing the basic concept) which bends the field of view of the camera through 90 degrees, providing the camera with an ability to look around corners, thus allowing the said high speed camera and the PROTECTIVE CAMERA HOUSING to be placed in a prepared 'hole in the mine wall', thereby gaining additional protection from the rock walls of the mine tunnel, and leaving only the said PROTECTIVE CAMERA HOUSING faceplate exposed to the full force of the blast shock waves and explosion debris created during underground blasting; and 4. a shock absorbing system both integrated into and external to the complete camera housing which allows the housing and individual pans of the housing to move in any direction when any kinetic energy generated during underground explosions, or by explosion debris or blast waves colliding with the PROTECTIVE CAMERA HOUSING, to be dissipated by transmission to all parts of the said PROTECTIVE CAMERA HOUSING, and thereby preventing a destructive localised build up of kinetic energy.

BRIEF DESCRIPTION OF THE DRAWINGS

In order that this invention, PROTECTIVE CAMERA HOUSING, may be more clearly understood, reference will now be made to the accompanying drawings which illustrate particular preferred embodiments of the invention by way of example, and in which.

DESCRIPTION OF PREFERRED EMBODIMENT

Figure 1:
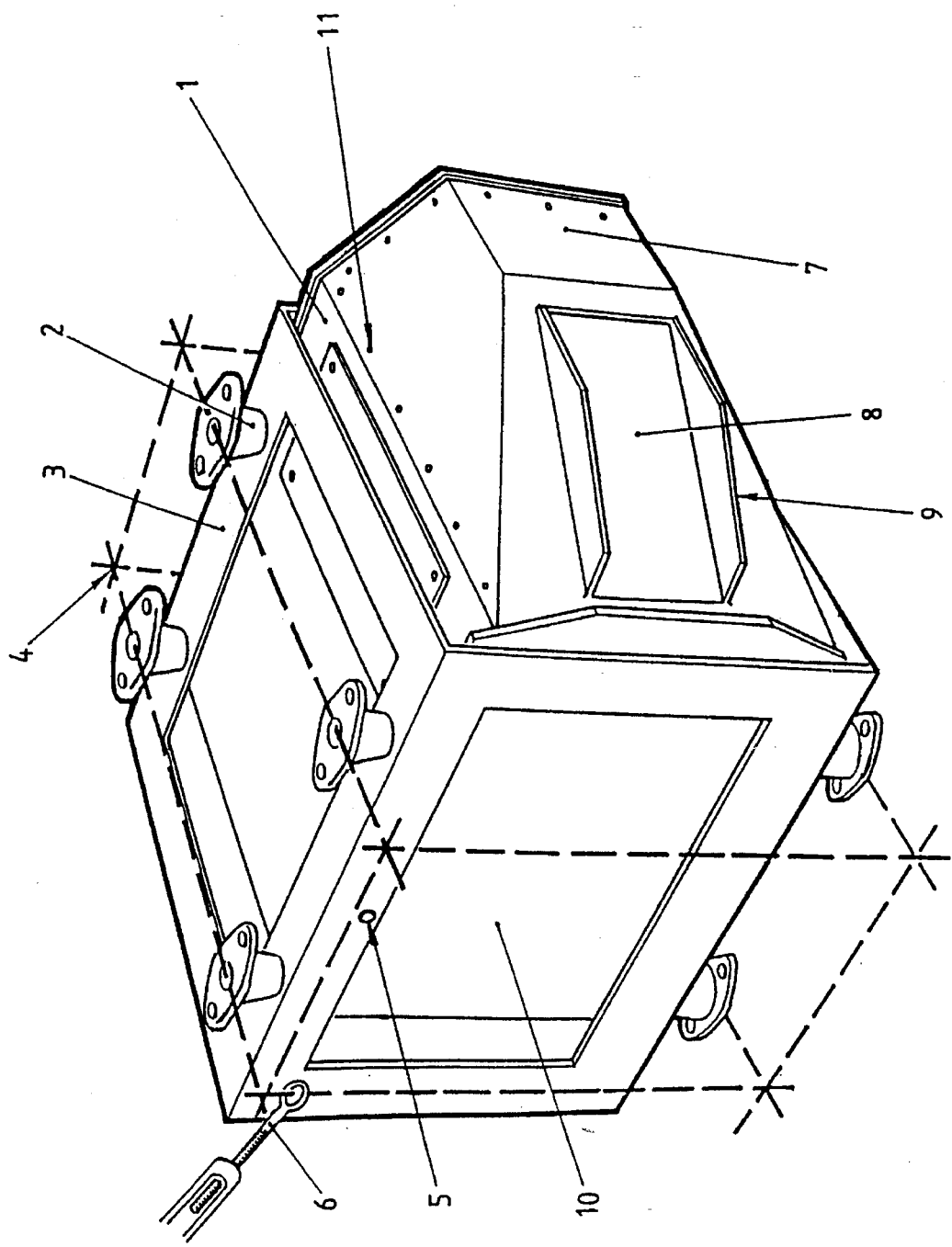
FIG. 1, is a perspective view showing the external arrangements of the principal components of the PROTECTIVE CAMERA HOUSING in accordance with the invention (it is important to note that the principal of this invention is not changed by changing the relative sizes or shape of the containment vessel, other than the face plate, ie, cylinders, rectangles or cubes will equally work,to accommodate different camera systems); although, for the purposes of this application, a cubic form has been used.

Referring first to FIG. 1, a perspective view, the PROTECTIVE CAMERA HOUSING is shown as a cubic box like structure (designated by reference numeral 1), suspended on moulded rubber mounting pods which allow the said housing to move globally and to isolate the said housing from ground vibration during blasting (numeral 2), attached to an inner frame (numeral 3) and an outer frame which keep the said housing suspended and correctly oriented and free to move (numeral 4) and locked in place by two retaining bolts (numeral 5) and held in place in the 'hole in the tunnel wall' by adjustable turnbuckles which attach to mine roof bolts placed in the mine tunnel walls (numeral 6). This box like structure, the PROTECTIVE CAMERA HOUSING, has a face plate which is capable of deflecting explosion debris, blast shock waves or other dangerous or destructive forces away from the main body of the housing (numeral 7) or its contents, which has a viewing window through which high speed cameras are able to view blasting patterns via an optical prism (see FIG. 2) which changes the camera field of view through a 90 degree change of direction so the camera can 'look around corners' through viewing port (numeral 8), with debris deflection flanges (numeral 9) which re-direct explosion debris away from the said viewing port surface (numeral 8), side and rear plates (numeral 10) and fixing screws (numeral 11). The cubic form has been used in this instance to illustrate the preferred embodiment, but equally a rectangular, tubular or spherical form could have been used without changing the basic concepts involved.

Figure 2:
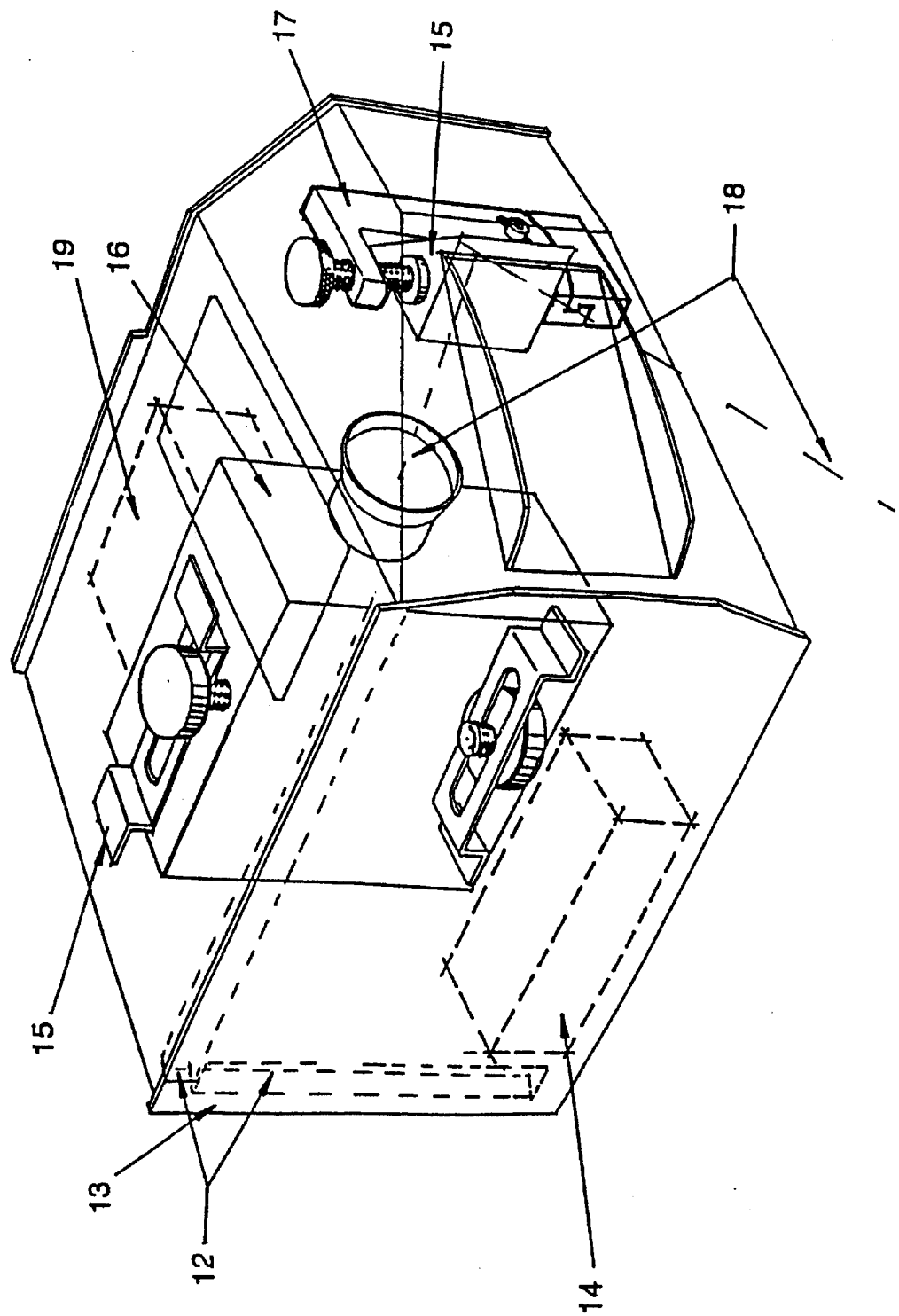
FIG.2, is a schematic view showing the internal arrangements of the principal components of the PROTECTIVE CAMERA HOUSING in accordance with the invention.

In FIG. 2, the schematic view, showing the internal arrangement of the principal components of the PROTECTIVE CAMERA HOUSING, the chassis members which are free floating and not directly connected to one another so minute movement can occur when kinetic energy is absorbed, shock absorbing gaskets (numeral 12) between the various external plates (numeral 13) of the said PROTECTIVE CAMERA HOUSING and the internal chassis members which assist in allowing minute movement for distribution and absorbtion of the kinetic energy created during collision of explosion debris, blast shock waves or other dangerous and destructive forces with the said faceplate (numeral 8), battery power pack for internal power supply (numeral 14), camera mounting brackets (numeral 15), optical prism (numeral 15) for changing the field of view of the high speed cameras (numeral 16) through a 90 degree change of direction so the camera can 'look around corners', prism mount (numeral 17), prism mount bracket which allows for the correct orientation of the optical prism and thus the camera field of view (numeral 18), and trigger circuit (numeral 19).

Figure 3:
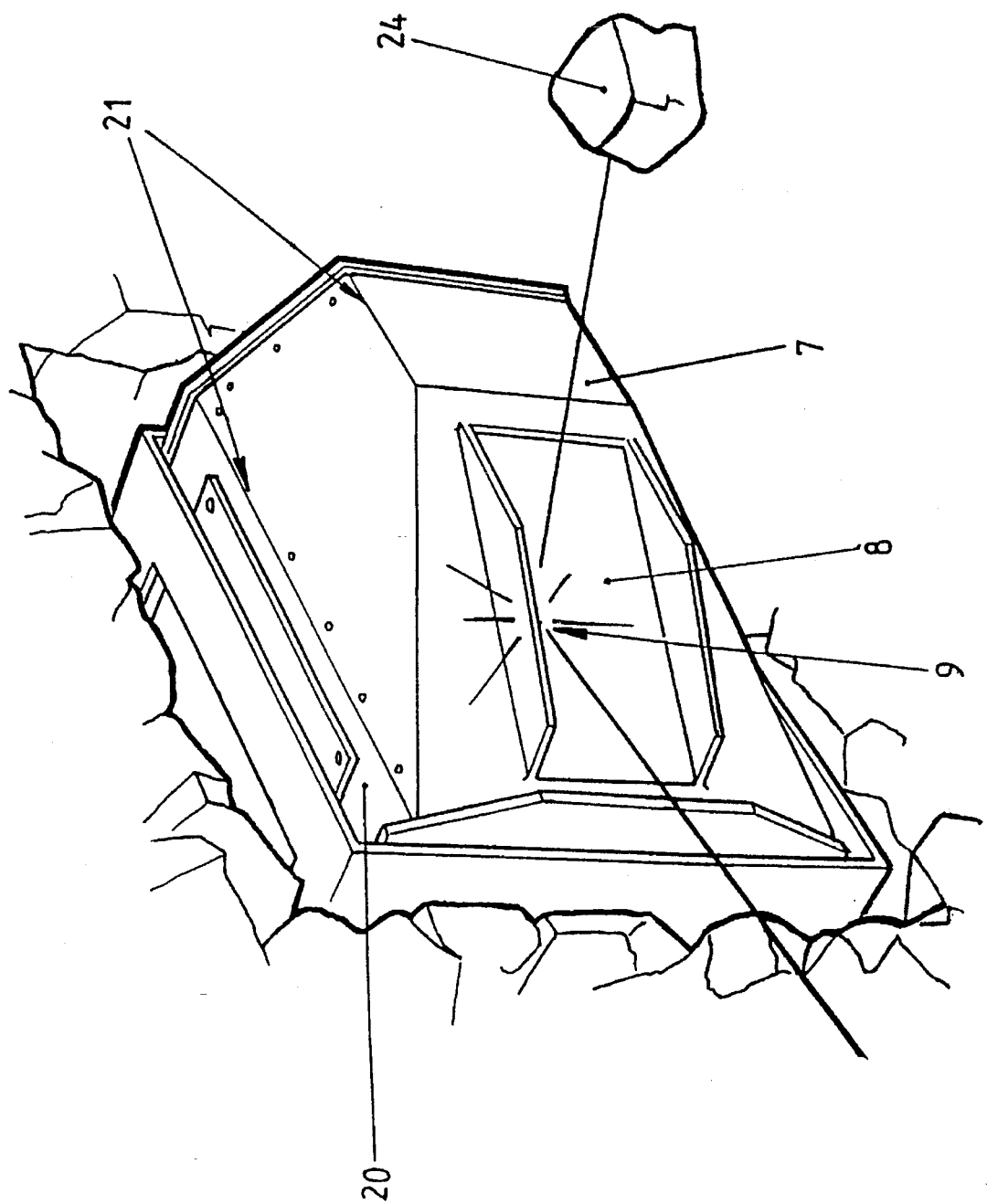
FIGS. 3, is a detail perspective view of the face plate of the PROTECTIVE CAMERA HOUSING, showing the angles which provide reinforcing strength to the protective camera housing, the position of the light bending prism (or mirror or reflective medium), the adjustment mechanism for the prism and the protective flanges which protect the viewing port from collisions by large debris, and the position of the armourplate viewing medium (glass, acrylic or plastic)

In FIG. 3, the PROTECTIVE CAMERA HOUSING's faceplate (numeral 7) is shown in more detail, with the obtuse angle of exposure to the blast, to facilitate the ricochet of explosion debris, blast shock waves or other dangerous or destructive forces off the faceplate and away from the main body of the housing (numeral 20) and its contents, clearly visible, the various side angles which are less than 90 degrees (numeral 21) and which add strength and facilitate the transfer of generated kinetic energy to other parts of the said PROTECTIVE CAMERA HOUSING, the viewing port (numeral 8) and the debris deflection flanges (numeral 9).

Figure 4:
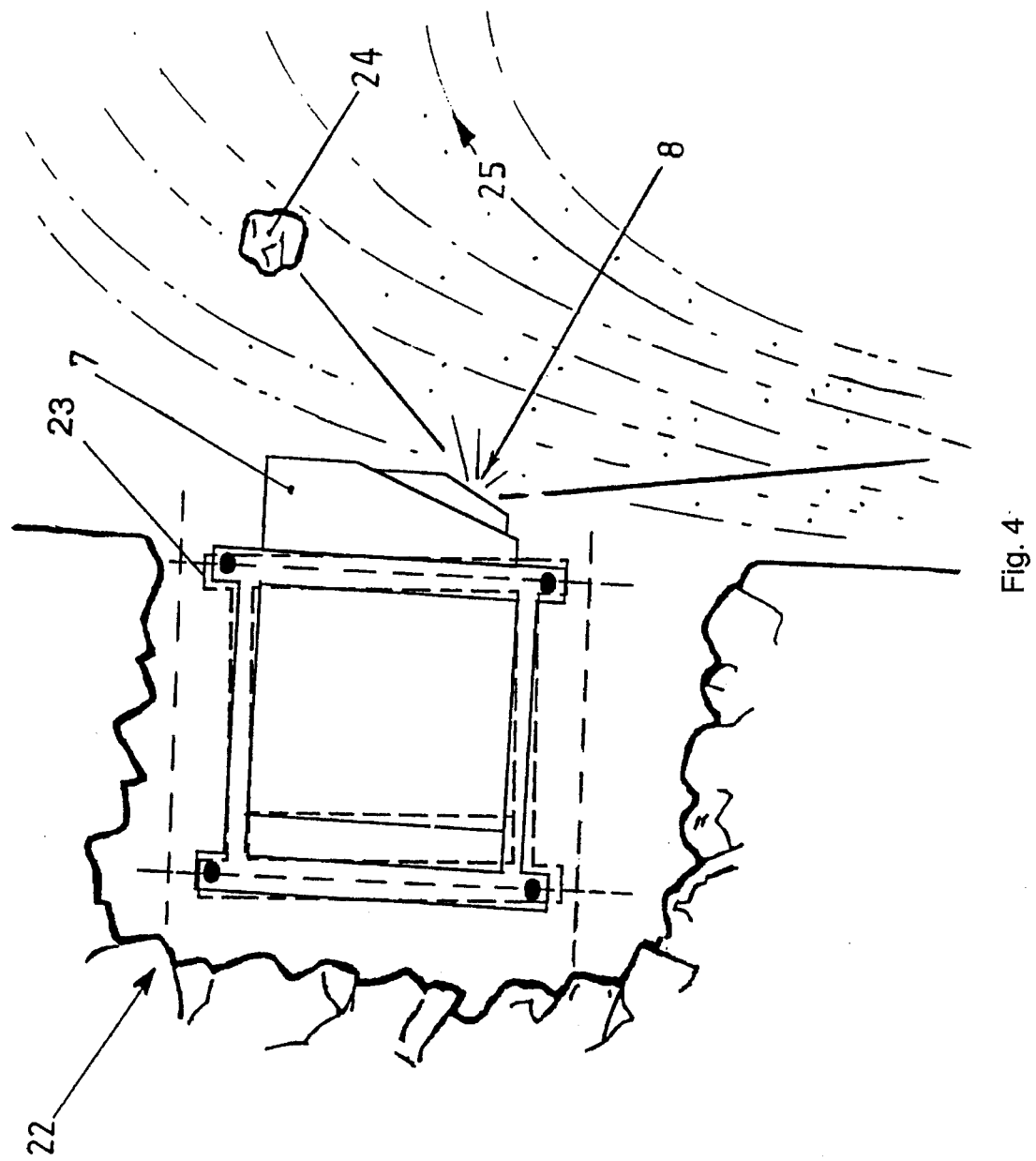
FIG. 4, is a somewhat perspective view showing the shock absorbing suspension system and how it would work during a collision between a large item of debris and the faceplate of the protective camera housing.

FIG.4, shows how the complete system sits in its designated position within the 'hole in the wall' which then uses the surrounding rock in the mine tunnel wall (numeral 22), for added protection from the forces generated during mine tunnel blasting, and dissipates energy through movement (numeral 23) when explosion debris (numeral 24), blast shock waves (numeral 25) or other dangerous or destructive forces collide with the viewing port (numeral 8).

What is claimed is:

1. A protective camera housing disposed to be placed in a three-dimensional hole with one side of said hole opening to a path that a shock wave of a destructive event is expected to take to permit the recording of said destructive event by said camera within said housing, said destructive event being initiated by an operator initiated signal, said housing comprising:

a three-dimensional case defining a port therethrough, said case sized and shaped to contain said camera therewithin and to fit within said three-dimensional hole with said port oriented to said open side of said hole;

a face plate to provide closure to said port of said three-dimensional case with at least a portion of said face plate at an oblique angle to said case to cause explosion debris and shock waves to be deflected away from said case and face plate;

a transparent viewing port mounted within said at least a portion of said face plate disposed to enable said camera within said case to view said shock wave when said housing is placed within said hole; and a light bending device mounted within said case to transmit images visible through said transparent viewing port to said camera to record said images with said camera out of the direct line of said explosion shock wave.

2. A protective camera housing as in claim 1 further comprises a shock absorbing suspension frame coupled to said three-dimensional case to mount said housing within said hole.

3. A protective camera housing as in claim 2 further comprises shock absorbing connectors between said three-dimensional case and said face plate to dissipate impact shock caused by explosion debris and blast shock wave collision with said face plate.

4. A protective camera housing as in claim 1 wherein said three-dimension case includes at least three sides and shock absorbing connectors between of said at least three sides to dissipate any explosion induced shock between each of said sides and shock absorbing connectors.

5. A protective camera housing as in claim 1 wherein said light bending device is a mirror.

6. A protective camera housing as in claim 1 wherein said light bending device is a prism.

7. A protective camera housing as in claim 1 wherein said case and face plate are constructed of pierce resistant material.

8. A protective camera housing as in claim 1 further comprises a pair of protective flanges extending outward from said fact plate in close proximity to two edges of said transparent viewing port to prevent large debris from impacting said transparent viewing port.

9. A protective camera housing as in claim 1 wherein said transparent viewing port is made from an armourplate viewing material.

10. A protective camera housing as in claim 1 wherein said transparent viewing port is made from acrylic.

11. A protective camera housing as in claim 1 wherein said shock absorbing connectors includes flexible joints and shock absorbing gaskets therewithin.

12. A protective camera housing as in claim 3 wherein shock absorbing connectors includes flexible joints and shock absorbing gaskets therewithin.

13. A protective camera housing as in claim 1 further comprises a trigger circuit responsive to said operator initiated signal and disposed to be coupled to said camera to cause said camera to record said destructive event.

14. A protective camera housing as in claim 13 further comprises an internal power supply to power said trigger circuit and disposed to power said camera.

15. A protective camera housing as in claim 14 wherein said internal power supply includes a bank of batteries.

16. A protective camera housing disposed to be placed in a three-dimensional hole with one side of said hole opening to a path that a shock wave of a destructive event is expected to take to permit the recording of said destructive event by said camera within said housing, said housing comprising:

a three-dimensional case defining a port therethrough, said case sized and shaped to contain said camera therewithin and to fit within said three-dimensional hole with said port oriented to said open side of said hole;

a face plate to provide closure to said port of said three-dimensional case with at least a portion of the surface of said face plate extending out from said hole at an oblique angle to said path;

a transparent viewing port mounted within said face plate disposed to enable said camera within said case to view said shock wave when said housing is placed within said hole; and a light bending device mounted within said case to transmit images visible through said transparent viewing port to said camera to record said images with said camera out of the direct line of said explosion shock wave.

* * * * *